Aug. 22, 1939.  A. R. MABEY  2,170,418
AUTOMATIC CONTROL SYSTEM
Filed Sept. 3, 1937
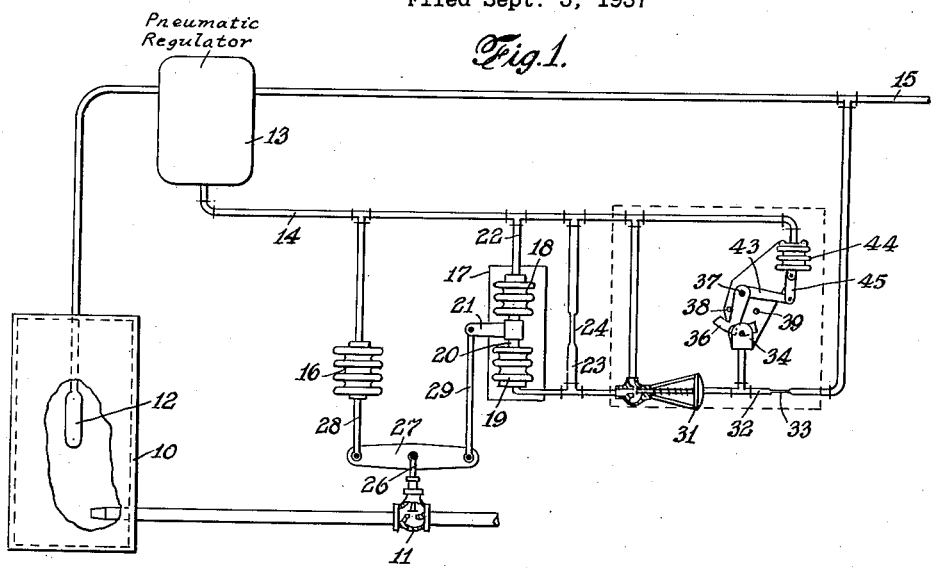
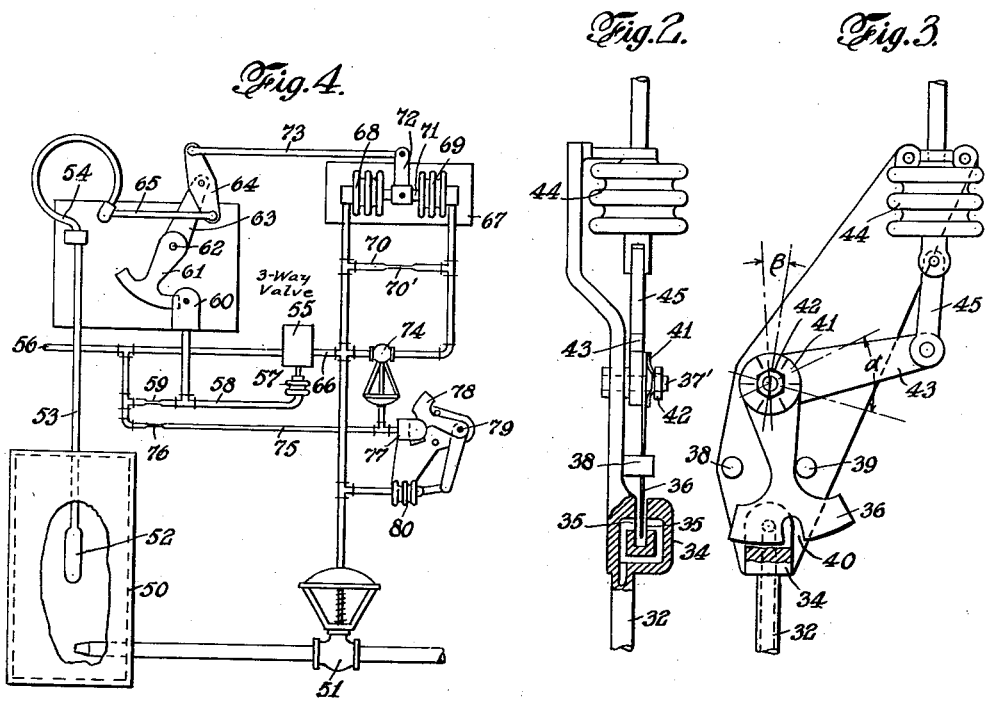
INVENTOR.
ARTHUR R. MABEY
BY
ATTORNEY.

Patented Aug. 22, 1939

2,170,418

UNITED STATES PATENT OFFICE

2,170,418

AUTOMATIC CONTROL SYSTEM

Arthur R. Mabey, Waterbury, Conn., assignor to The Bristol Company, Waterbury, Conn., a corporation of Connecticut Application September 3, 1937, Serial No. 162,277

6 Claims. (Cl. 236—86)

This invention relates to automatic control devices and systems and more especially to control systems of that class wherein regulation of a variable condition in response to physical changes therein is effected by apparatus responsive to the rate as well as to the degree of such changes. Such a control system is exemplified in U. S. Letters Patent #2,005,773, granted to Luis de Florez, June 25, 1935, in which patent disclosure is made of two bellows elements jointly exerting their respective influences through a floating lever on a valve adapted to control the flow of a fluid medium. One of the aforesaid elements comprises a single bellows unit acting directly on one end of the floating lever; and the other element comprises two opposed bellows units acting on the other end of the lever, the latter serving to communicate to a valve a movement representative of the joint influence of the bellows elements. The opposed bellows members are adapted to be actuated by internal pressure of a control fluid from a common source—in this instance, the same source as the single unit—and, by means of a constricted section in the conduit leading to one of the opposed bellows members, the action of the latter member is delayed relatively to the other, thus introducing a time element in the ultimate response of the opposed units.

This principle has been widely applied in various forms of automatic control devices and has effected material improvements in performance, due to the tendency to anticipate the final demand for correction in the controlled condition, as based on the rate of change in that condition.

In the operation of control devices of the general nature hereinbefore set forth, there has been observed one shortcoming, which becomes apparent upon a reversal in the direction of change of the controlled condition. Considering such a system applied to the regulation of temperature and the temperature to be manifesting a tendency to rise, the immediate action of the main control element would be to effect a reduction in flow of a heating agent, while the action of the auxiliary control element would be to temporarily augment the action of the principal control, and, as conditions approached a steady value, to withdraw this action and leave the regulation entirely subject to the primary control element. With such an arrangement, it will be apparent that upon a sudden reversal in the demand for control; i. e. a sudden fall in temperature before a state of equilibrium was attained, the temporary action of the auxiliary control element would be the exact reverse of that required; and this undesirable condition would remain effective until the secondary element had attained a state of equilibrium and had readjusted the action of its opposed elements in keeping with conditions representing a falling—rather than a rising—temperature.

It is an object of this invention to eliminate the above-described undesirable characteristic of control devices of this class by the superposition automatically of a further control element, at once simple, effective, and positive in operation, as well as capable of universal application to a wide variety of control devices in which the rate-of-change feature is incorporated.

In carrying out the invention there is associated with such time-delayed element a means which is subject to a condition of the controlling fluid pressure for momentarily rendering the said time-delayed element instantaneous in action. For example, provision is made for by-passing the constricted section between the two opposed bellows elements.

The nature of the invention, however, will best be understood when described in connection with the accompanying drawing, in which:

Fig. 1 is a diagrammatic representation of a simple control system utilizing the principles of the invention.

Figs. 2 and 3 are side and front elevations, respectively, to an enlarged scale and partly in section, of certain elements whereby the principles of the invention may be expeditiously exemplified.

Fig. 4 is a diagrammatic representation of a pneumatic control system utilizing the invention in a manner alternative to that shown in Fig. 1.

Referring to Fig. 1 of the drawing, 10 designates a closed vessel or enclosed space in which it is desired to maintain by the admission of a suitable heating agent such as steam, through a valve 11, a constant temperature as determined by a sensitive bulb 12. The latter contains an expansible fluid and forms a part of a closed system including a regulator 13, which may be of any one of a variety of types well known to the art, but preferably of the form set forth in U. S. Letters Patent #1,880,247, granted October 4, 1932.

The regulator 13, in response to temperature changes at the bulb 12, serves to control in an outlet conduit 14 the pressure of air derived from a constant-pressure source 15. For purposes of the disclosure, the regulating instrument may be taken of the conventional type in which a rise in the temperature to which the sensitive bulb is exposed tends to effect regulation by a corresponding increase of air pressure in the conduit 14.

Operatively associated with the conduit 14 is a fluid-pressure-actuated motor element consisting of a single bellows member 16, adapted to change its linear dimension with variations in internal fluid pressure derived from the conduit 14. Also connected to the conduit 14 is a secondary control element 17, consisting of a pair of opposed bellows members 18 and 19, acting on a common stem 20, to which is affixed an arm 21 adapted to actuate external parts of the mechanism, as will hereinafter be set forth. Bellows member 18 is connected to the conduit 14 through a conduit 22. Bellows member 19 is connected to the conduit 14 through a conduit 23 having therein a constricted or throttling section 24, whereby the flow of control fluid to and from the bellows member 19 is appreciably delayed.

The valve 11 includes a stem member 26, and is internally arranged so that the valve is opened as the stem is withdrawn from the body and closed as it is forced thereinto. A floating lever 27, having three pivot points longitudinally disposed thereon, is pivoted at its intermediate point to the stem 26 of the valve 11. To one end of the lever 27 is pivotally attached the bellows member 16 through means of a link 28, while to the remote extremity of the lever 27 is attached the arm 21 through a link 29.

The apparatus as thus far set forth constitutes a well known form of automatic regulating device; and for it no invention is herein claimed. The auxiliary means through which improved performance is obtained, and for which invention is herein claimed, comprises the following elements: A fluid-pressure-actuated valve 31 of the "direct-acting" class, in which the valve is caused to close in response to the application of fluid pressure in its diaphragm chamber, and opened in response to a relief of said pressure, is connected between the conduits 14 and 23, so that when open it will provide free communication between the same, bypassing the constricted portion 24 and rendering its time-delay characteristic ineffective.

Compressed air (at a pressure of, say, 15 lbs. per square inch) is supplied to the diaphragm chamber of the valve 31 from the constant pressure source through a conduit 32 having a constricted portion 33. Communicating with the conduit 32 is a vent in the form of an orifice member 34 having double-opposed jets 35. A vane member 36 is adapted to swing about an axis 37 through a limited angle, as determined by stops 38 and 39, and to pass freely between the opposed jets of the orifice member 34.

Referring to Figs. 2 and 3, wherein is shown a detail of the venting or orifice member, it will be seen that the vane member 36 has a slot or gap 40 in the intermediate part of its contour, so that, as the vane swings about its axis 37, the jets 35 will be relatively unobstructed when the slot 40 is juxtaposed thereto with the vane in its mid-position, and will be relatively obstructed by the vane member when the latter is at or near either limit of its swing, as determined by the stops 38 and 39.

Carried by a hub or spindle 37' coaxial with the axis 37 and frictionally engaged with the vane member 36, as by a spring washer 41 and a clamping nut 42, is a lever arm 43 adapted to swing about the axis 37 and to carry with it the vane member 36, except when the deflection of the vane member is limited by either of the stops 38, 39, when continued deflection of the lever arm 43 is permitted by the spring washer 41. Thus, while the arm 43 may swing through a wide angle α as shown in the drawing, the excursion of the vane 36 is limited to the relatively small angle β.

A bellows member 44, operatively attached to the lever arm 43, as by a link 45, is placed in communication with the conduit 14, so that the angular position of the lever arm 43 about the axis 37 is dependent upon the air pressure in the conduit 14. It will be apparent that, upon any change in pressure in the conduit 14, the bellows 44 will deflect in a corresponding sense, and will similarly move the lever arm 43, which, in turn, will carry with it the vane member 36, until the latter engages one or other of the stops, when the lever arm may continue to deflect without imparting further movement of the vane. It will further be apparent that, upon a reversal of direction of change of pressure in the conduit 14, the vane 36 will at once leave the stop against which it has been resting and will deflect toward the other stop, and that during the transition the slot 40 will pass between the jets 35, causing a momentary loss of pressure in the conduit 32, and a corresponding momentary opening of the valve 31, serving to by-pass the constriction 24 and permit equalization of pressure in the bellows members 18 and 19, allowing them to assume their neutral or intermediate position of balance.

Following is a description of a typical operation of the control system. Assume there first to exist a steady-state condition, in which the supply of heating agent through the valve 11 is exactly equal to the demand, and the last previous action in the control system to have been one on which air pressure in the conduit 14 was increased. This last action having been reflected in a linear extension of the bellows member 44, the vane 36 will have been deflected toward the left, as shown in Fig. 1, and will be resting against the stop 38. The orifice member will thus be obstructed by the solid part of the vane, so that the valve 31 will be closed and the constriction 24 will provide the only communication between the bellows member 19 and the conduit 14.

Assume now that there takes place a rise of temperature at the bulb 12. This, through the regulator 13, will effect an increase in pressure in the conduit 14, with a corresponding immediate action on the bellows member 16, and a tendency to close the valve 11. At the same time the bellows member 18 will be extended in opposition to the bellows 19 (whose response to change of air pressure in the conduit 14 will be delayed due to the constriction 24) and will act through the floating lever 27 to add its effect to that of the bellows 16. This will operate to further close the valve 11, the auxiliary effect, however, being subsequently and gradually withdrawn as the pressure in bellows member 19 becomes equalized with that in bellows 18 due to seepage of air through the constriction 24.

As thus far described, the performance set forth represents the normal operation of the device in its well-known form; and, under the circumstances outlined, the temporary enhanced action of the control valve and subsequent withdrawal of that action, due to the combination of bellows members 18 and 19 and the constriction 24, provides a desirable operating characteristic. Assume, however, that shortly after there has taken place a change in condition as outlined, and before there has elapsed sufficient time to enable the pressures in bellows members 18 and 19 to become equalized, the "trend" of regulation should reverse. That is to say, a further change in demand for the heating agent occurs, the same taking place in the reverse sense to the first-named change, so that there will be a demand for an opening, rather than a closing, action on the part of the valve 11. Due to the normal action of the substantially instantaneous parts of the control system, as above set forth, the pressure in the conduit 14 will be lowered, with a consequent shortening of the bellows member 16, which, acting on the left-hand end of the floating lever 27, will immediately tend to open the valve 11. The secondary control system 17, however, being deflected in a sense to close the valve 11, and not yet having had sufficient time to return to a state of equilibrium, would normally be super-imposing on said valve through the lever 27 an action which for the time is the exact reverse of that required to effect ideal control. Such action will continue until sufficient time has elapsed to permit establishment in bellows members 18 and 19 of pressures having relative values similar to what would have been attained had the said bellows members been in a state of equilibruim at the moment the last-mentioned change occurred.

Considering now the action of the auxiliary control mechanism, it will be seen that upon the lowering of pressure in the conduit 14, consequent upon a demand for opening of the valve 11, the bellows member 44, like the bellows 16, will tend to collapse, decreasing its length. This action operating through the lever arm 43 and the friction members associated therewith will at once deflect the slotted vane 36 away from the stop 38 toward the right-hand position, as shown in Fig. 3 of the drawing, during the process of which deflection the orifice member 34 will be momentarily opened as the slot 40 passes between the jets 35, causing a momentary loss of pressure in the conduit 32. This results in a corresponding momentary opening of the valve 31, as hereinbefore set forth, whereby the constriction 24 will be by-passed and the pressures in bellows members 18 and 19 allowed to equalize without delay, with resultant elimination of the above-mentioned undesirable performance heretofore characterizing reversal of trend in the controlling requirements.

In Fig. 4 is shown an alternative embodiment of the invention, which, while incorporating a principle identical with that hereinbefore set forth, presents a modified application of the same more in keeping with the recognized practices of pneumatic control. In the drawing, 50 designates a closed chamber in which it is desired to maintain by the admission of steam or other suitable heating agent through a pneumatically operated valve 51 of the direct-acting class, a predetermined and constant temperature, as determined by a sensitive bulb 52 placed within the chamber 50 and exposed to the atmosphere therein.

The bulb 52 contains an expansive or volatile fluid whose pressure will vary with the temperature to which the bulb is exposed, and is connected by means of a capillary tube 53 to a Bourdon spring 54 forming a part of a pneumatic regulator, which may be of the class set forth in the above-cited Patent #1,880,247 and modified in the following manner: A three-way valve 55 of the supply-and-waste type, adapted to receive air from a constant-pressure source 56 and to regulate the outgoing pressure of the same, is arranged to be operatively actuated by a bellows member 57 in such a sense that increase of fluid pressure within said bellows member will cause the valve to lower the pressure of air delivered by the valve 55, and vice versa. Bellows member 57 is placed in communication with the constant-pressure source 56 by a conduit 58 having a constricted portion 59; and connected to the conduit 58 is an orifice member 60 having double-opposed jets substantially as set forth in the above-mentioned Letters Patent #1,880,247. A vane member 61 is adapted to swing through a limited angle about an axis or spindle 62, and to pass between the jets of the orifice member 60 in a sense more or less to obstruct the escape of air therefrom, and thereby govern the back-pressure in the conduit 58 and in the bellows member 57. Fixed to the axis or spindle 62 is a lever-arm 63, having pivotally attached to its extremity the mid-point of a floating lever 64. The lower end of this floating lever, as seen in the diagram, is attached by a link 65 to the Bourdon spring 54.

Communicating with the outlet side of the valve member 55 is a conduit 66, providing a direct connection to the diaphragm top of the pneumatically actuated valve 51. This valve, being of the direct-acting class, will tend to close with increase of pressure in the conduit 66, and vice versa.

Communicating also with conduit 66 is a pneumatic motor element 67 comprising opposed bellows members 68 and 69, the former being in direct communication with the conduit 66, and the latter through a conduit 70, having a constricted portion 70'. Bellows members 68 and 69 are adapted to act in opposition on a common stem 71, and this stem carries an arm 72 which is connected by means of a link 73 to the upper end (as shown in the drawing) of the floating lever 64.

Between conduits 66 and 70 is connected a direct-acting pneumatically-operated valve 74, having its diaphragm-top or motor element in communication with the constant-pressure air source 56 through a conduit 75 having a constricted portion 76. Communicating with conduit 75 is an orifice member 77 having a slotted vane 78 and adapted to be actuated through a friction joint 79 from a bellows member 80 communicating directly with conduit 66, the construction and operating principle of this element of the mechanism being identical with that shown in Figs. 2 and 3.

The action of this embodiment of the invention may be analyzed as follows: Consider a condition in which the temperature under control manifests a tendency to fall. This will be reflected in a decrease in fluid pressure within the bulb 52 and the Bourdon spring 54, and a consequent deflection toward the left of the lower end of the floating lever 64 and of the upper end of lever arm 63, whereby the vane 61 will be deflected toward the orifice member 60, obstructing the same, and causing the pressure of air in the conduit 58 to be increased, with a corresponding extension of the bellows member 57 and a movement of the valve 55 in a sense to reduce air pressure in the conduit 66 and all members communicating therewith.

The immediate result of the reduced pressure in conduit 66 is to cause the valve 51 to open and increase the flow of heating agent to the space within the chamber 50, thus tending to compensate for the tendency toward falling temperature.

A secondary result of the reduction of pressure in the conduit 66 is found in an immediate contraction of the bellows 68 and a retarded contraction of the bellows 69. The response of bellows 68 will move the upper end of the floating lever 64 toward the left, tending to move the vane 61 further toward the orifice member 60, thus accentuating the original action as above set forth. The subsequent response of bellows 69, as the air pressure therein falls to that in the conduit 66 by seepage through the constriction 76, will restore the arm 72, the link 73, and the upper end of lever 64 to their original positions, and remove the temporary effect of the pneumatic motor element 67. This principle in automatic control is well known in practice and for it no invention is herein claimed.

The action of the auxiliary element 67 will thus be seen to be equivalent to that of the auxiliary device 17 shown in Fig. 1, and to possess the same well-known advantages in the control of varying magnitudes. A study of its operating characteristics will reveal here, however, as in other control devices of this type, that upon a reversal of the "trend" of control, as hereinabove set forth, the time characteristic of the opposed bellows combination may temporarily defeat its purpose; and it is with a view to eliminating this fault that there has been provided the by-passing valve 74 and the auxiliary devices adapted to effect its operation, which is substantially equivalent to the action of valve 31, whose performance has hereinbefore been fully described.

Assuming again the condition of the trend of control being such as to effect a lowering of pressure in the conduit 66, it will be seen that with the consequent tendency of the bellows 80 to collapse, the vane 78 will be resting in the position shown and obstructing the escape of air from the orifice member 77. This maintains the air pressure on the diaphragm of valve 74 and holds said valve in a closed position. Upon a reversal of the trend of control, as reflected in a tendency of the pressure in conduit 66 to increase, the first increment of pressure in this direction will tend to expand the bellows 80, causing the vane 78 to be swung in a counter-clockwise sense to the lower stop, and, as the slotted portion thereof passes the orifice member 77, to release the air pressure in conduit 75 and in the diaphragm chamber of valve 74. The said valve is thereby permitted to open momentarily, whereupon the pressures in bellows 68 and 69 will be equalized and the combination placed in a condition to effect its normal compensation performance without inhibitions persisting from the previous trend of control.

I claim:

1. In a fluid-pressure-actuated control system including a first bellows member and a second bellows member, together with a conduit connecting the same and including a constriction whereby to delay the action of the second bellows member, and a source of fluid under pressure connected with the first bellows member: a second conduit by-passing the constriction of said first-named conduit and a pressure-actuated valve controlling the passage of fluid through the former conduit, and means subject to the pressure applied to said first bellows to control said valve and including means to vary momentarily the pressure on said valve.

2. In a fluid-pressure-actuated control system including a first bellows member and a second bellows member, together with a conduit connecting the same and including a constriction whereby to delay the action of the second bellows member, and a source of fluid under pressure connected with the first bellows member: a second conduit by-passing the constriction of said first-named conduit and a pressure-actuated valve controlling the passage of fluid through the former conduit, and means subject to the pressure applied to said first bellows to control said valve and including an orifice member in communication with the actuating means for the valve and an element cooperating therewith having a port to register with the orifice of said orifice member and movable through the actuation of the means subject to the pressure applied to said first bellows.

3. In an apparatus for controlling changes of temperature or pressure in a controlled system by means responsive to pressure changes in a pressure system, a mechanical device communicating with said pressure system, which device first responds fully and immediately to a pressure change in said system and then retracts said response in accordance with the rate of said pressure change, means communicating with said mechanical device for operating control devices in said controlled system in accordance with changes effected in said pressure system and transmitted to said control devices through the intermediary of said mechanical device, together with a normally closed pressure-actuated valve, and fluid-pressure-actuated means operable upon a reversal of direction of a change in pressure in said system to open the same momentarily and thereby render such retractive action full and immediate in response to said change.

4. In a fluid-pressure-actuated regulating system having a first bellows member and a second bellows member both adapted to respond to pressure changes of a fluid, a first conduit for conveying a fluid under controlled pressure to said first bellows member, a second conduit for conveying said fluid to said second bellows member, and including a constriction whereby the response of said second bellows member to said fluid pressure changes is delayed relatively to the response of said first bellows: valve means, and fluid-pressure-actuated means operable upon a reversal of direction of a change in said system to open said valve means momentarily, and thereby by-pass said constriction and render it for the time ineffective to introduce an element of delay.

5. In a fluid-pressure-actuated regulating system having a first bellows member and a second bellows member both adapted to respond to pressure changes of a fluid, a first conduit for conveying a fluid under controlled pressure to said first bellows member, a second conduit for conveying said fluid to said second bellows member, and including a constriction whereby the response of said second bellows member to said fluid pressure changes is delayed relatively to the response of said first bellows: a fluid-pressure-actuated valve by-passing said constriction, a conduit for applying fluid under pressure to said valve to maintain the same in a closed condition, an orifice member in said last-named conduit, a constriction in said last-named conduit in advance of the orifice member, a movable vane member adapted to obstruct the escape of fluid under pressure from said orifice, thereby maintaining pressure on said valve and having an intermediate interrupted portion adapted when in juxtaposition to the orifice of said orifice member to permit escape of fluid therefrom, the throttling effect of said last-named constriction causing a corresponding release of pressure on said valve and opening of the same, a fluid-pressure motor element in communication with said first bellows member, mechanical means operatively associating said motor element with said vane member, stops limiting the excursion of said vane member in either direction to a portion of that corresponding to the normal range of deflection of said motor member, and a friction joint included in said mechanical means and adapted to yield in a sense to permit continued deflection of said motor element as said vane engages either of said stops.

6. In a fluid-pressure-actuated regulating system having a first bellows member and a second bellows member both adapted to respond to pressure changes of a fluid, a first conduit for conveying a fluid under controlled pressure to said first bellows member, a second conduit for conveying said fluid to said second bellows member, and including a constriction whereby the response of said second bellows member to said fluid pressure changes is delayed relatively to the response of said first bellows; a fluid-pressure-actuated valve by-passing said constriction, a conduit for applying fluid under pressure to said valve to maintain the same in a closed condition, an orifice member in said last-named conduit, a constriction in said last-named conduit in advance of the orifice member, a vane member movable in proximity to the orifice of said orifice member and having solid end portions adapted to obstruct the escape of pressure fluid from the orifice, thereby causing pressure to be maintained on said valve and having an open intermediate portion adapted to permit the escape of said fluid subject to its flow through said last-named constriction, thereby causing pressure upon said valve to be released and the valve correspondingly opened, together with a fluid-pressure motor element in communication with said first bellows member, mechanical means operatively associating said motor element with said vane member, stops limiting the excursion of said vane member in either direction to a portion of that corresponding to the normal range of deflection of said motor member, said vane, when limited by either stop resting in a position in which one of its solid portions will be juxtaposed to said orifice, and a friction joint included in said mechanical means and adapted to yield and permit continued deflection of said motor element as said vane engages either of said stops.

ARTHUR R. MABEY.